US007056422B2

United States Patent
Dell'Orfano

(10) Patent No.: US 7,056,422 B2
(45) Date of Patent: Jun. 6, 2006

(54) BATCH THERMOLYTIC DISTILLATION OF CARBONACEOUS MATERIAL

(75) Inventor: William Dell'Orfano, Bedford, NH (US)

(73) Assignee: Sector Capital Corporation, NV (US)

( * ) Notice: Subject to any disclaimer, the term of this patent is extended or adjusted under 35 U.S.C. 154(b) by 630 days.

(21) Appl. No.: 10/417,751

(22) Filed: Apr. 17, 2003

(65) Prior Publication Data

US 2003/0196884 A1 Oct. 23, 2003

Related U.S. Application Data

(63) Continuation-in-part of application No. 09/469,458, filed on Dec. 21, 1999, now abandoned.

(60) Provisional application No. 60/117,380, filed on Jan. 27, 1999.

(51) Int. Cl.
*C10B 1/00* (2006.01)

(52) U.S. Cl. ............... 202/219; 202/262; 202/117; 202/118; 202/119; 202/103; 202/108; 422/268; 422/269; 422/270; 422/271

(58) Field of Classification Search ............. 202/219, 202/262, 117, 118, 119, 103, 108; 198/705, 198/706, 710, 712, 725, 804; 422/268–271, 422/301; 48/92; 201/10, 11
See application file for complete search history.

(56) References Cited

U.S. PATENT DOCUMENTS

| 4,508,564 | A | * | 4/1985 | Kennedy | 75/403 |
| 4,614,752 | A | * | 9/1986 | Fuchs et al. | 521/44.5 |
| 4,925,532 | A | * | 5/1990 | Meuser et al. | 202/219 |
| 5,449,438 | A | * | 9/1995 | Jagau et al. | 201/10 |
| 5,852,062 | A | * | 12/1998 | Carpenter | 521/41 |
| 6,051,110 | A | * | 4/2000 | Dell'Orfano et al. | 202/219 |
| 6,346,221 | B1 | * | 2/2002 | Wagner | 422/184.1 |

* cited by examiner

*Primary Examiner*—Glenn Caldarola
*Assistant Examiner*—Alexis Wachtel
(74) *Attorney, Agent, or Firm*—John L. Lee

(57) ABSTRACT

A distillation system is provided for batch thermolytic distillation of lump carbonaceous material, such as lump wood and shredded rubber tires. The system preferably includes multiple distillation units mounted side-by-side. Each unit includes a reactor bath for holding molten tin at approximately 455° C., a two-compartment reservoir for storing molten tin, and a porous basket pivotally mounted within the reactor bath for tipping motion. A process for batch thermolytic distillation of lump carbonaceous material includes rotating the porous basket into a reactor bath by rotating the basket about an axis passing through the reactor bath; putting a charge of wood into the basket; closing a retractable lid onto the reactor bath; filling the reactor bath with molten material to produce gas and char by thermolytic conversion of the charge, draining the reactor bath of molten material while the lid is closed; quenching the char in the reactor bath with steam; opening the lid; and tipping the char from the basket.

30 Claims, 8 Drawing Sheets

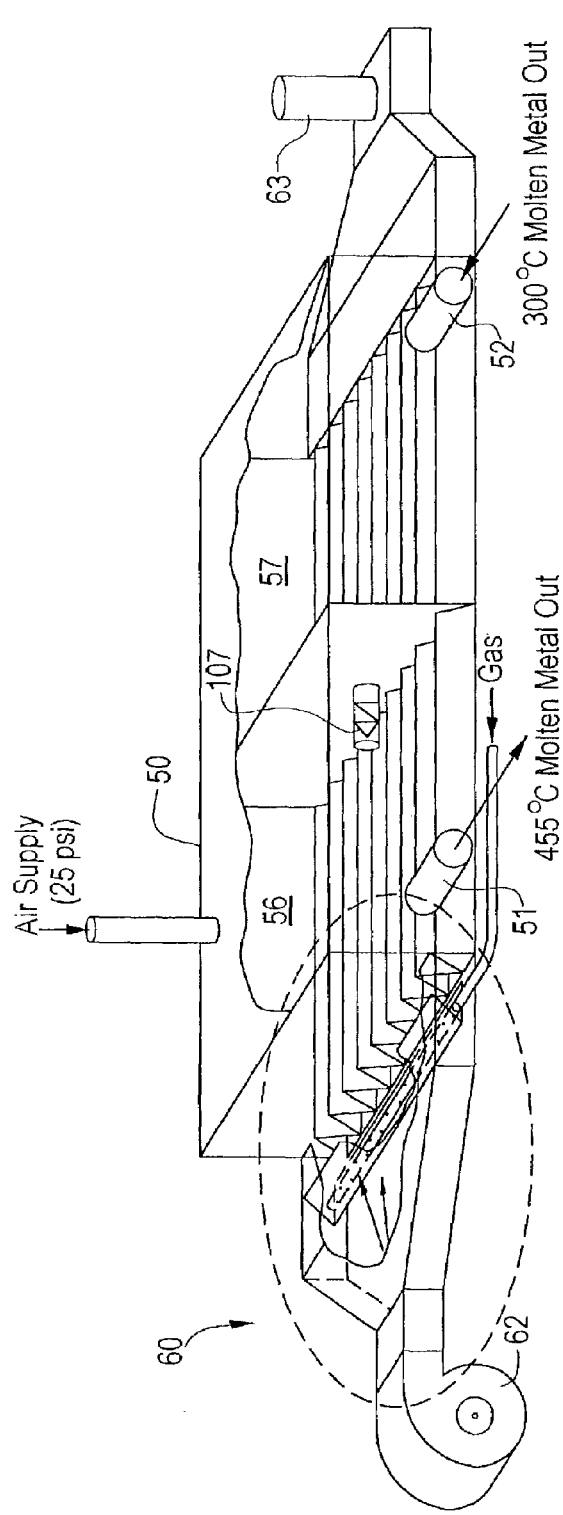
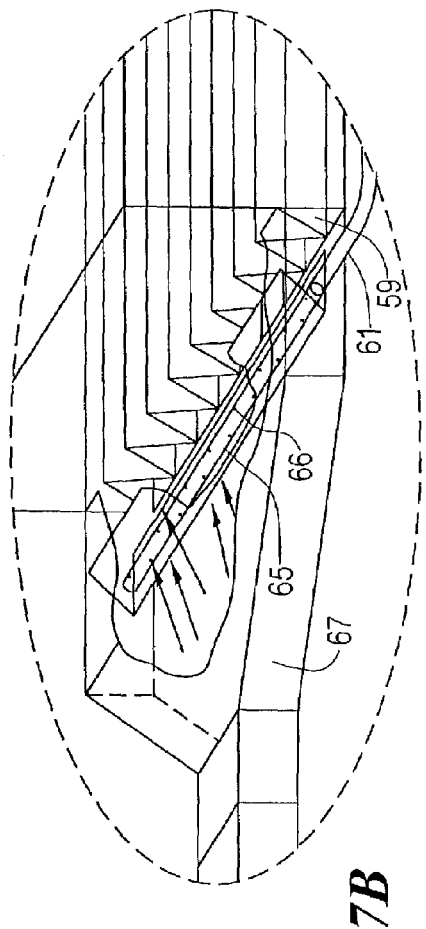
FIG. 7A
FIG. 7B

BATCH THERMOLYTIC DISTILLATION OF CARBONACEOUS MATERIAL

This application is a continuation-in-part application of U.S. application Ser. No. 09/469,458 filed Dec. 21, 1999, now abandoned which claims the benefit of U.S. provisional application No. 60/117,380 filed Jan. 27, 1999.

TECHNICAL FIELD

The invention relates generally to transformation of carbonaceous material such as waste wood and shredded rubber tires into liquid hydrocarbons and char.

BACKGROUND ART

The need for better methods for disposal of waste products has long existed. Society now recognizes the need to handle waste products in an environmentally sound manner that avoids building landfills and creating air or water pollution. Further, carbonaceous material may yield commercially desirable products. The concept of using molten metal, including lead, tin, etc. for the thermal conversion of organic matter into useful products is generally known. U.S. Pat. No. 2,450,550 to Stamm discloses distillation of granular wood or coal by submerging the granules in a molten metal bath and passing the granules through the bath, sandwiched between two endless screens. U.S. Pat. No. 3,977,960 to Stout et al. discloses thermal conversion of crushed oil shale into useful products in a chamber containing molten metal or salt in the absence of air, and the use of recovered oil in air sealing means (column 4, line 19). U.S. Pat. No. 5,085,738 to Harris et al. discloses thermal conversion of organic wastes, including vehicle tires, into useful products in a chamber containing molten lead, in the absence of air, utilizing gravity rather than a container or the like to convey the wastes through the molten lead. U.S. Pat. No. 5,693,188 to Donnohue et al. discloses thermal conversion of organic wastes, including vehicle tires and plastics, into useful products in an elongated chamber containing molten lead, in the absence of air, utilizing an auger to convey the wastes through the molten lead. U.S. Pat. No. 5,605,551 to Scott et al. discloses a process for thermal conversion of biomass such as wood to liquids by pyrolysis in a fluidized bed in which the conveying gas contains low and carefully controlled amounts of oxygen. U.S. Pat. No. 5,584,970 to Schmalfeld et al. discloses a process for thermal conversion of biomass such as wood to charcoal, the process involves drying the wood in a first flow of hot gas and then carbonizing the wood in a second flow of hot gas.

Throughout the world, there are millions of tons of carbonaceous material scrap waiting for a reasonable way of recycling. Actual utilization of the wood scrap in the industrialized countries are:

1) Combustion in furnaces to produce electric power and steam.
2) Conglomeration to produce low quality dirty wood, tools or furniture.
3) Reforming of pallets.
4) Production of wood-dust for drying purposes.
5) Recovery of cellulose raw materials.
6) Production of coke carbon by pyrolysis.

The prior art has not suggested a commercially viable processing method and apparatus for thermal conversion of scrap carbonaceous material into commercially desirable products. As a consequence, any activity which creates significant quantities of scrap carbonaceous material presents the owner with a costly disposal problem. Typically, the owner ships the scrap carbonaceous material from his site to another site for disposal. Thus, the owner pays to ship the scrap carbonaceous material off-site, and then pays burial or other disposal fees for disposing of the scrap carbonaceous material.

DISCLOSURE OF INVENTION

Objects of the Invention

A principal object of the present invention is to provide an improved process and distillation unit for on-site thermal conversion of scrap carbonaceous material including wood, shredded rubber tires or other organic matter into commercially desirable products in a way that minimizes the disposal problems faced by the owners of sites that create significant quantities of scrap carbonaceous material. Further objects are to provide an improved process and distillation unit wherein scrap carbonaceous material is immersed in molten material and thereby converted to gaseous hydrocarbons and char; to further provide such a process wherein scrap carbonaceous material is thermally converted to vapor forms that may be condensed and further separated to commercially valuable hydrocarbons and char; to further provide such a process wherein residual solids from the thermal conversion, including char, are captured and separated; to further provide such a process wherein a portion of the combustible vapors emitted from the thermal conversion of organic matter is utilized to heat the molten material bath in the reaction bath; to further provide such a process and apparatus that minimizes the risk of exposure of operating personnel to the high temperatures of the molten material; to further provide such a process wherein the self-ignition of combustible products is prevented by maintaining an effective barrier between hot combustible products and air; to further provide such a process wherein the process fluids are recycled to minimize both heat loss and release of environmental pollutants; to further provide such a distillation unit adapted to accept input from an on-site loading platform used on typical scrap wood source sites; to further provide such a distillation unit adapted to deliver output to a conventional belt conveyor system used on typical scrap wood source sites; to further provide such a distillation unit adapted for side by side mounting of multiple machines between a loading platform and a belt conveyor system to facilitate proper sizing of throughput capacity at each site; to further provide such a process and distillation unit that is relatively simple, and utilizes inexpensive equipment.

SUMMARY OF INVENTION

The present invention provides an apparatus and process for batch thermolytic distillation of lump carbonaceous material including waste wood and shredded rubber tires.

A preferred embodiment of the apparatus includes a distillation unit including a reactor with a reactor bath adapted to hold a molten material selected from a group of molten materials consisting of molten metal and molten salt, a retractable lid, and a basket pivotally mounted within the reactor bath between a pair of opposing reactor bath walls.

In a distillation unit intended for side-by-side mounting of multiple units and for receiving a charge of wood from above a first end of the unit, the reactor is located at a first end of the unit. The basket is pivotally mounted for tipping the basket from a first position inside the reactor bath in an upright orientation, to a second position partially inside and partially outside the reactor bath in a substantially inverted orientation.

The preferred embodiment includes at least one hydraulic hold-down clamp attached between reactor and lid. The lid includes a perimeter curtain wall having a beveled lower rim shaped to fit a facing beveled rim of the reactor bath, and a perforated screen. In a preferred embodiment the reactor further includes an inlet conduit for molten material, an outlet conduit for molten material, and a reactor gas outlet; and the unit further includes a reservoir for storing molten material, the reservoir having a supply conduit coupled to supply molten material to the reactor inlet conduit, and a return conduit coupled to accept molten material from the reactor outlet conduit. The base of the reactor is higher than the top of the reservoir by approximately three feet. The reservoir includes two compartments with a check valve connecting them, a pressurized air inlet, and a controllable vent. The reservoir also includes an excess-air heater, and a corrugated heat exchanger. The distillation unit further comprises a steam generator and a steam generator flue. The reservoir further includes an excess-air heater and an excess air heater flue. The excess-air heater flue is coupled to deliver excess-air heater flue gas to the steam generator. The excess-air heater flue is coupled to deliver excess-air heater flue gas to the steam generator flue via a bypass flue and a control valve. The reactor bath includes a wall conduit. The distillation unit further includes a condenser with a particulates trap having a pressure region below atmospheric pressure.

The present invention also provides a process for batch thermolytic distillation of carbonaceous material such as lump wood or shredded rubber tires.

In a preferred embodiment, the process includes rotating a porous basket into a reactor bath; putting a charge of lump carbonaceous material into the basket; closing a retractable lid onto the reactor bath; and filling the reactor bath with molten material to produce gas and char by thermolytic conversion of the charge. For distillation of wood or shredded rubber tires, the molten material is preferably molten tin at a temperature of approximately 851° F. (455° C.). Rotating the porous basket into the reactor bath includes rotating the basket about an axis within the reactor bath. Closing the lid includes translating the lid and lowering the lid. The preferred embodiment further includes forcibly holding the lid closed while the temperature in the reactor bath is above a predetermined temperature.

Filling the reactor with molten material includes moving molten material by gravity or by air pressure. The process preferably includes moving molten material through the basket for a predetermined period of time after filling the reactor bath with molten material, and raising the surface of the molten material at a sufficient rate to ensure that steam given off from newly heated charge effectively prevents oxygen from reacting with newly formed char.

The molten material is preferably heated using an excess air heater using combustible fluids produced in the reactor bath and further using heat from hot air recovered during condensing to heat the molten material. A flow of molten material through the reactor bath is preferably maintained during thermolytic distillation.

In a preferred embodiment, the process further includes draining the reactor bath of molten material while the lid is closed; quenching the char in the reactor bath with steam; opening the lid; and removing the char from the basket. Draining the reactor bath includes driving superheated steam into the reactor bath. Superheated steam is produced at a temperature of about 228° F., and a pressure of about 20 psi, using flue gas from an excess air heater. The char is quenched with steam until the temperature of the char is below a self-ignition temperature. Opening the lid includes raising the lid using hydraulic actuators, and retracting the lid using a drive screw to place the lid under a lip of a loading platform. Removing the char from the basket includes rotating the basket about an axis within the reactor bath.

In a preferred embodiment, the process further includes condensing, in a pressure region below atmospheric pressure, a mixture of gas from thermolytic conversion of the charge and steam introduced in quenching.

BRIEF DESCRIPTION OF DRAWINGS

FIG. 7A is a schematic perspective view of a portion of the reservoir, showing the excess-air heater.

FIG. 7B is an enlarged portion of FIG. 7A, giving detail of the excess-air heater.

DETAILED DESCRIPTION OF INVENTION

General

The invention provides a process and a distillation unit for converting carbonaceous material into useful product by thermolysis (dissociation of a compound by heat in a bath of molten metal, or molten salt, in the absence of oxygen). In a first preferred embodiment the invention provides a process for converting wood to wood-petrol and char by immersion in molten tin at a temperature of approximately 851° F. (455° C.). In a second preferred embodiment the invention provides a process for converting shredded rubber tires to hydrocarbons and char by immersion in molten tin. Shredded rubber tires may be converted at substantially the same temperature at which wood is converted, approximately 851° F. (455° C.).

The Distillation Unit

Figure 1:
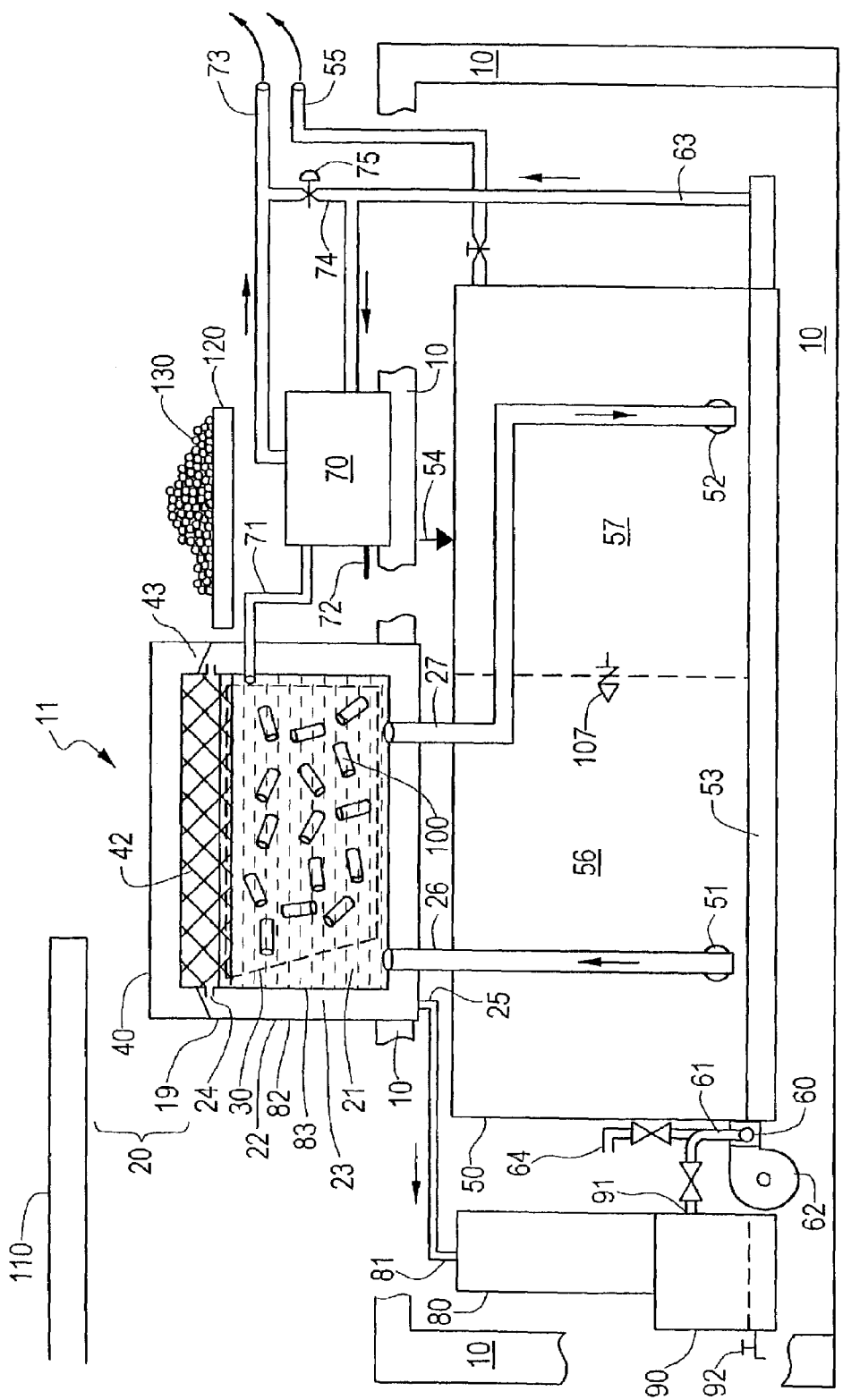
FIG. 1 is a schematic representation of a first embodiment of the distillation unit of the invention.

Distillation unit 11 of the preferred embodiment, which includes frame 10, is shown in FIG. 1 between loading platform 110 and belt conveyor system 120. FIG. 1 shows reactor bath 19 of reactor 20 in the reaction phase containing molten tin 21 and porous basket 30, with retractable lid 40 on top of the reactor. The front of distillation unit 11 is shown beneath loading platform 110. The back of the distillation unit is shown beneath belt conveyor system 120. "Front to back" defines a long axis of the distillation unit.

Figure 2:
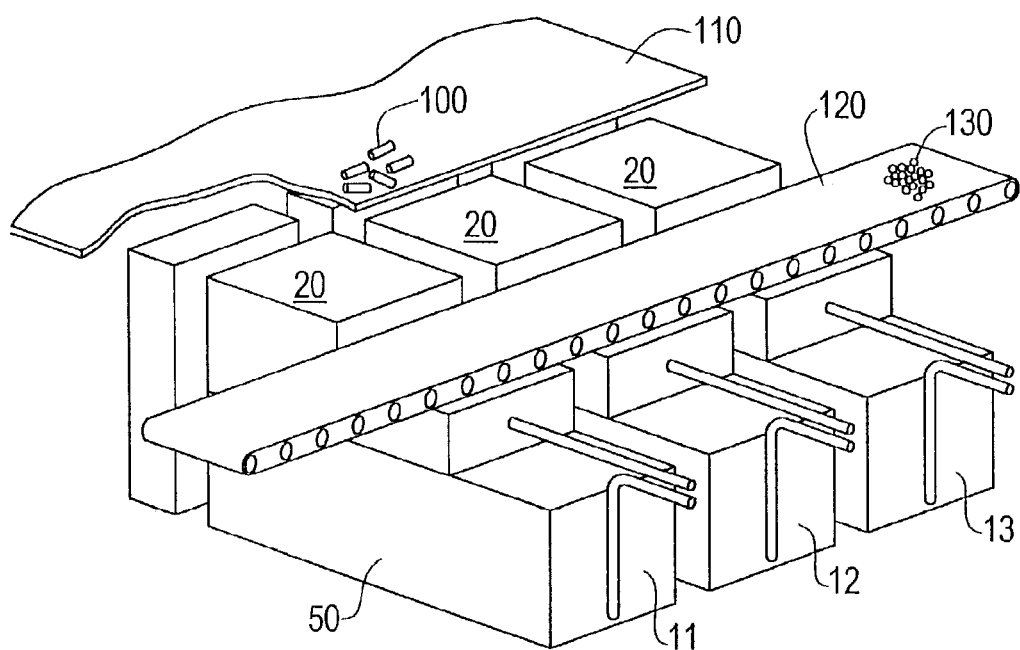
FIG. 2 is a partial cut-away perspective view of multiple distillation units of FIG. 1 between an on-site loading platform and a belt conveyor system.

Multiple distillation units, 11, 12, 13, etc. may be mounted side-by-side, as shown in FIG. 2, to match the throughput requirements of a given site.

Figure 3A:
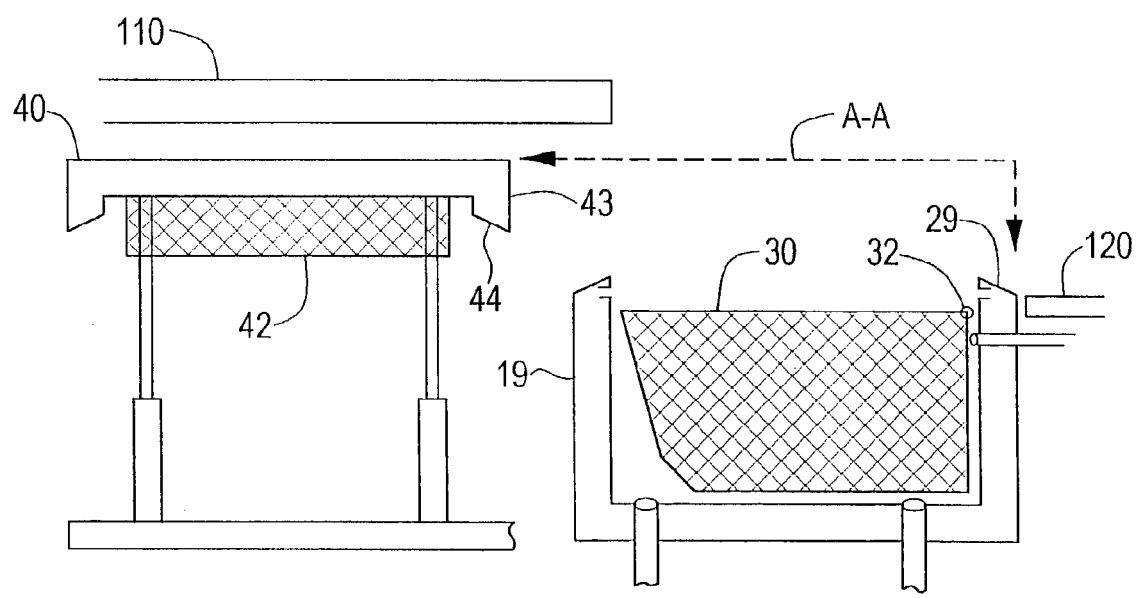
FIG. 3A is a cut-away elevation view of the reactor, the loading platform, and the reactor lid of FIG. 1, illustrating the retraction and replacement of the lid.
Figure 4:
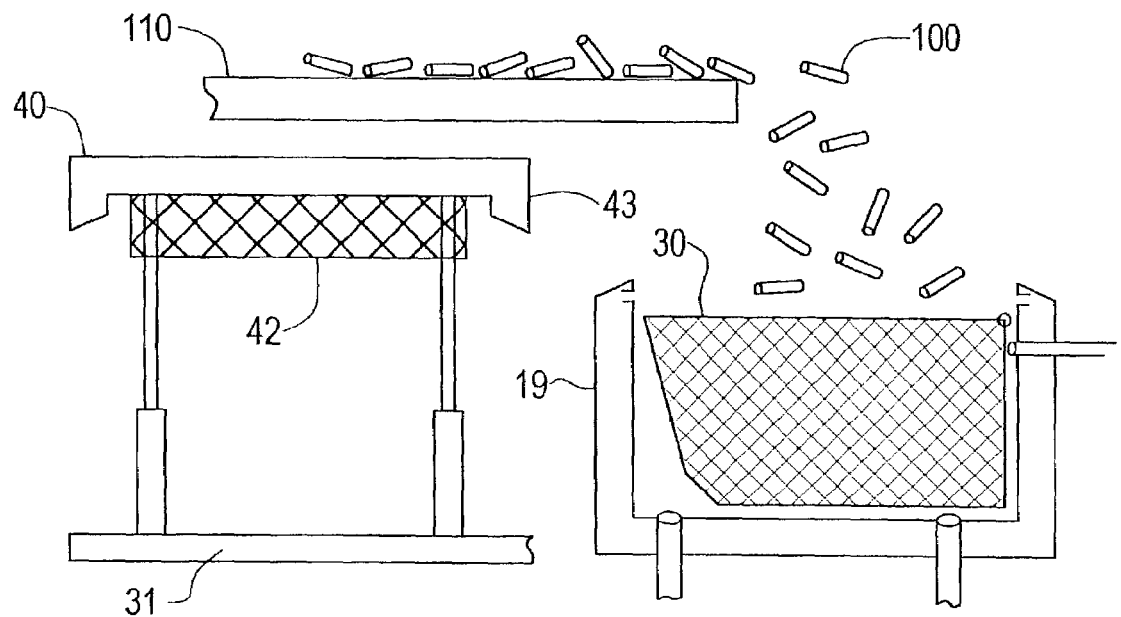
FIG. 4 is a schematic elevation view of the reactor, the loading platform, and the basket of FIG. 1, illustrating the loading of the basket with wood.
Figure 5:
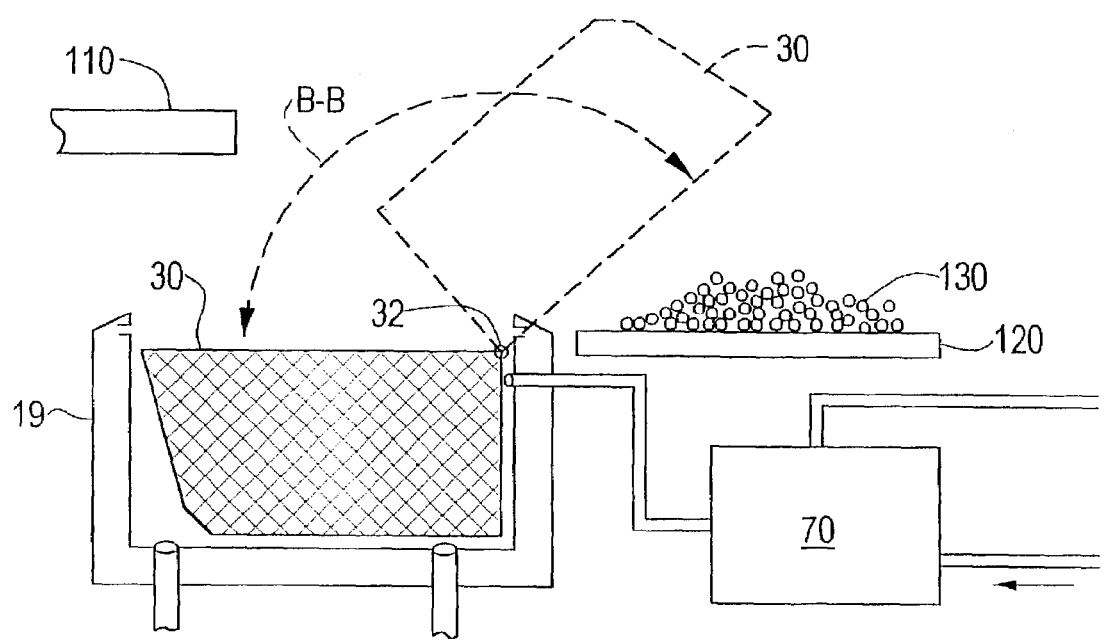
FIG. 5 is a schematic elevation view of a portion of FIG. 1, showing the basket tipping the char onto the conveyor system.

The retraction and replacement of the lid with respect to loading platform 110 and conveyor system 120 is shown in FIG. 3A. The loading of reactor 20 with a charge of lump wood 100 from the loading platform is shown in FIG. 4. The tipping of char 130 from basket 30 onto the conveyor system is shown in FIG. 5.

The reactor is fabricated from stainless steel AISI 310 or other material resistant to the temperature and chemicals involved in the process. FIG. 1 shows reactor 20 having a reactor gas outlet 25, an inlet conduit 26, and an outlet conduit 27.

Figure 3B:
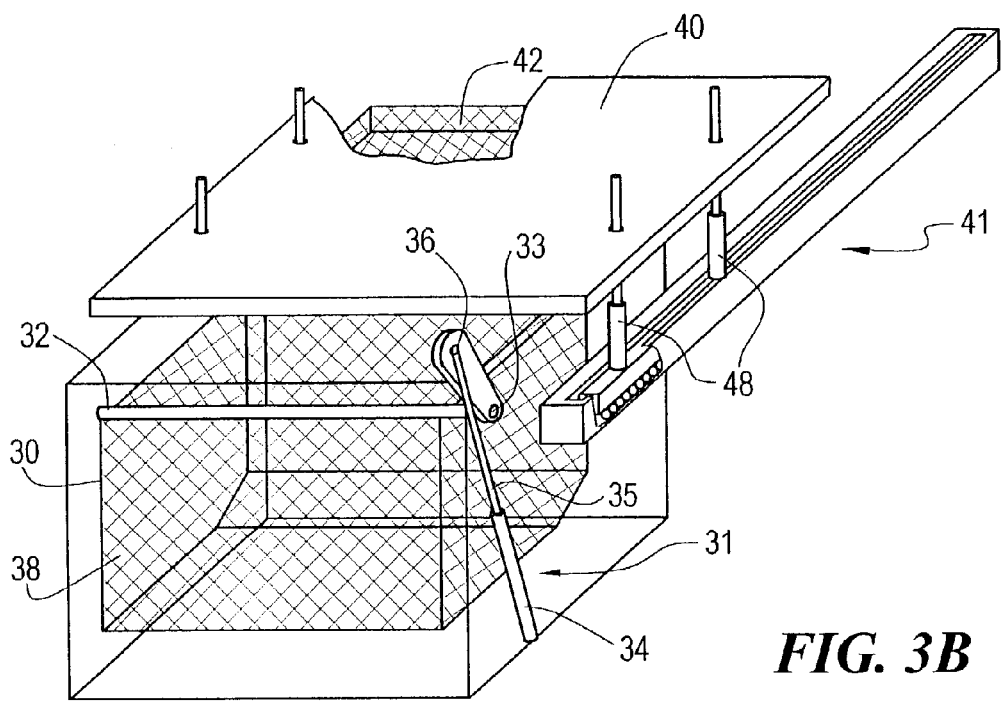
FIG. 3B is a perspective view of the lid carrier and basket carrier of the embodiment of FIG. 1.

The purpose of basket 30 is to contain wood in the reactor before and during the reaction phase and to carry char out of the reactor after the reaction phase. The walls of the basket are made of heavy wire mesh or heavy pressed steel having multiple apertures 38 which allow the molten tin to penetrate the basket and contact the lump wood. In a preferred embodiment the basket is 60 inches long, 36 inches deep and 60 inches wide. Apertures may be formed by the wire mesh construction shown in FIG. 3B or may be narrow slits as in expanded pressed steel. In either case the apertures need to be small enough in at least one dimension to prevent pieces of wood having small cross section from falling out of the basket through the apertures. The wood to be processed has a maximum cross section to ensure that all of the wood is fully cooked in the fixed immersion time that the apparatus is designed to provide.

Figure 3C:
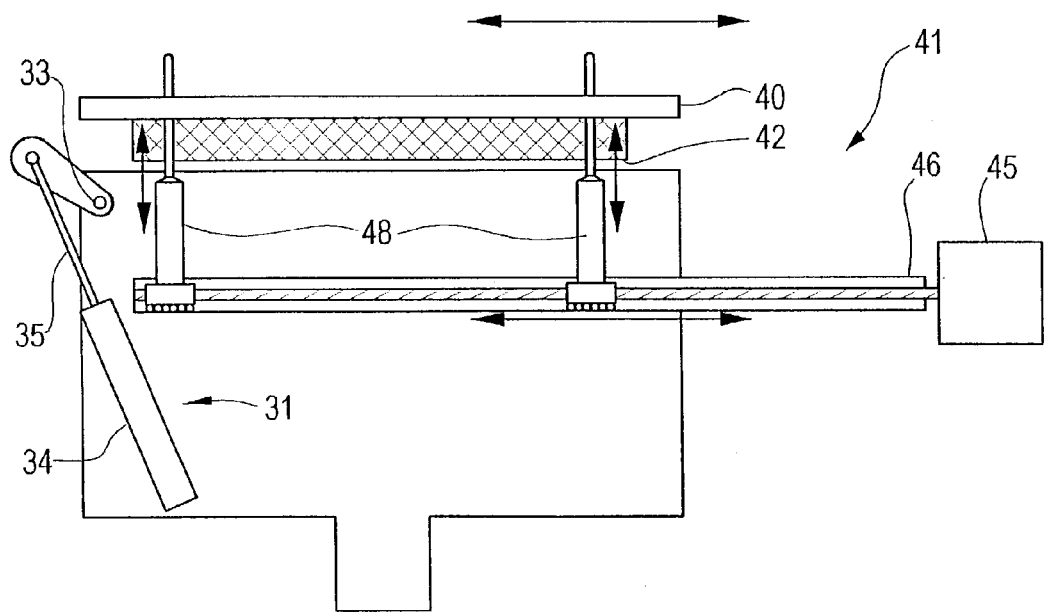
FIG. 3C is a schematic elevation view of the lid carrier and basket carrier of FIG. 3B, giving more detail.
Figure 3D:
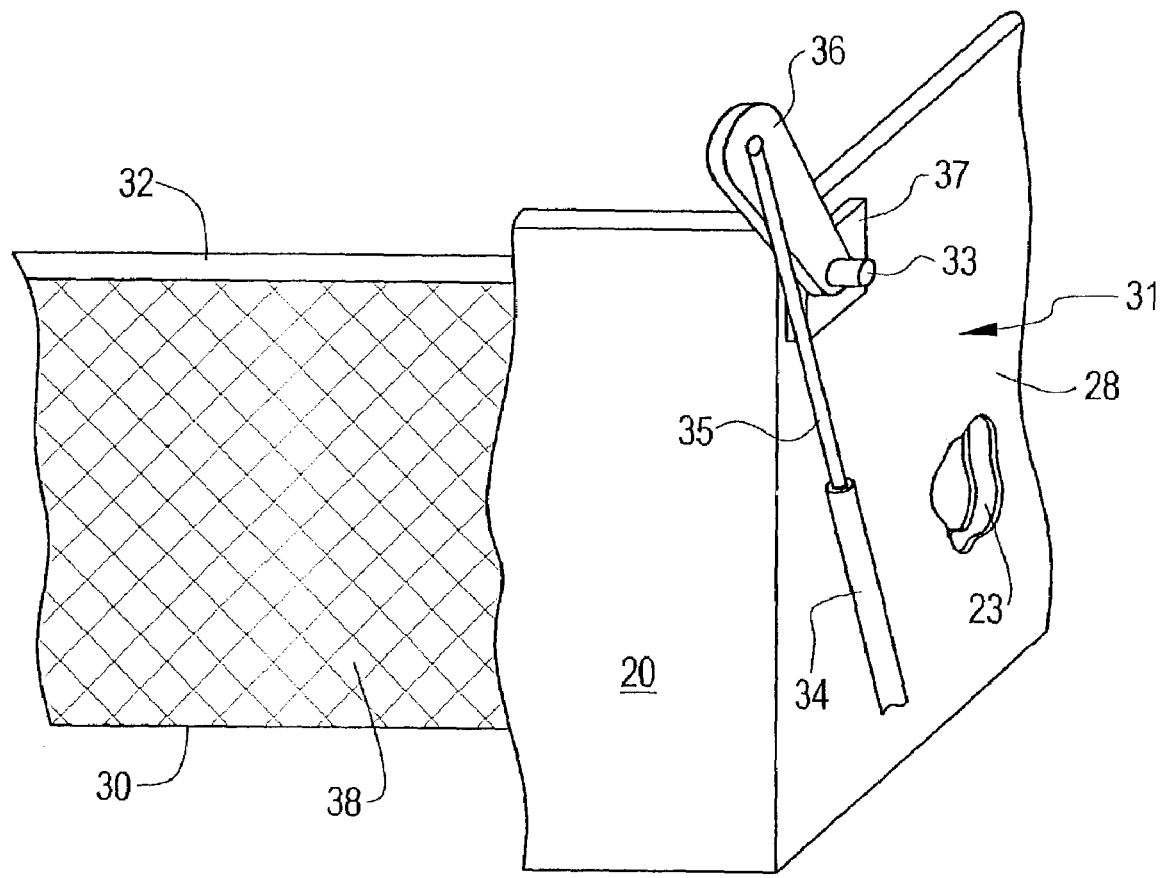
FIG. 3D is a cut-away perspective view of the basket carrier and pivot plate of the embodiment of FIG. 1.

The basket is pivotally mounted about a pivot axis that is transverse to the long axis of the apparatus. FIG. 3D shows the basket carrier of the embodiment of FIG. 1, and pivot bar 32 and pivot plate 37 which together define a pivot axis within reactor bath 19. In a preferred embodiment, pivot bar end 33 extends though side wall 28 and pivot plate 37, and is attached to the lower end of basket carrier lever 36. Pivot plate 37 provides a pressure seal bearing to maintain the integrity of reactor vessel 20. To tip char from the basket, basket carrier actuator cylinder 34 pulls basket carrier drive rod 35 down so as to rotate basket carrier lever 36 and basket 30 about the pivot axis. FIG. 3D also shows the basket having aperture 38. In an alternative embodiment, not shown, pivot bar 32 may be supported by a pivot plate wholly within the reactor bath and a rotational drive may be detachably coupled to pivot bar 32 only while the lid is retracted.

Referring again to FIG. 1, reactor 20 has a double wall 22, including outer wall 82 and inner wall 83, that defines a wall conduit 23. The double wall substantially surrounds the reactor. Gas given off in the reactor during the reaction phase flows through wall conduit 23, thereby providing thermal insulation for the molten tin in the reactor.

Below the reactor is reservoir 50 which stores molten tin for use in the reactor. Reservoir 50 has a supply conduit 51 coupled to supply molten tin to the reactor via inlet conduit 26. Reservoir 50 also has a return conduit 52 coupled to accept molten tin from outlet conduit 27 of the reactor. To drive molten tin into the reactor, and to receive molten tin from the reactor, reservoir 50 has a first compartment 56 coupled by check valve 107 to a second compartment 57, a pressurized air inlet 54, and a controllable vent 55. To allow molten tin to drain from the reactor under gravity, the top of reservoir 50 is approximately three feet below the base of reactor 20. Reservoir 50 also has a corrugated bottom heat exchanger 53, and an excess air heater 60 for heating the molten tin in the reservoir. Heater 60 has a fuel supply line 61, and an air blower 62 set for a 10:1 ratio, air to gas, at the burner. Hot gas enters heat exchanger 53 at a temperature above 480° C., and leaves at a temperature in the range 310–320° C. via excess-air heater flue 63. A first portion of the gas from flue 63 supplies heat to steam generator 70.

Steam generator 70 supplies quenching steam to the reactor during the quenching phase via steam conduit 71. The steam generator receives water from water supply 72, and heat from a first portion of hot gas from flue 63. Exhaust from the steam generator at a temperature of approximately 260° C. is vented via flue pipe 73. A second portion of hot exhaust gases passing through flue 63 is vented via bypass flue pipe 74 and flue pipe 73, under control of flue pipe control valve 75. Valve 75 is used to stabilize the temperature of hot gas entering the steam generator.

Figure 8:
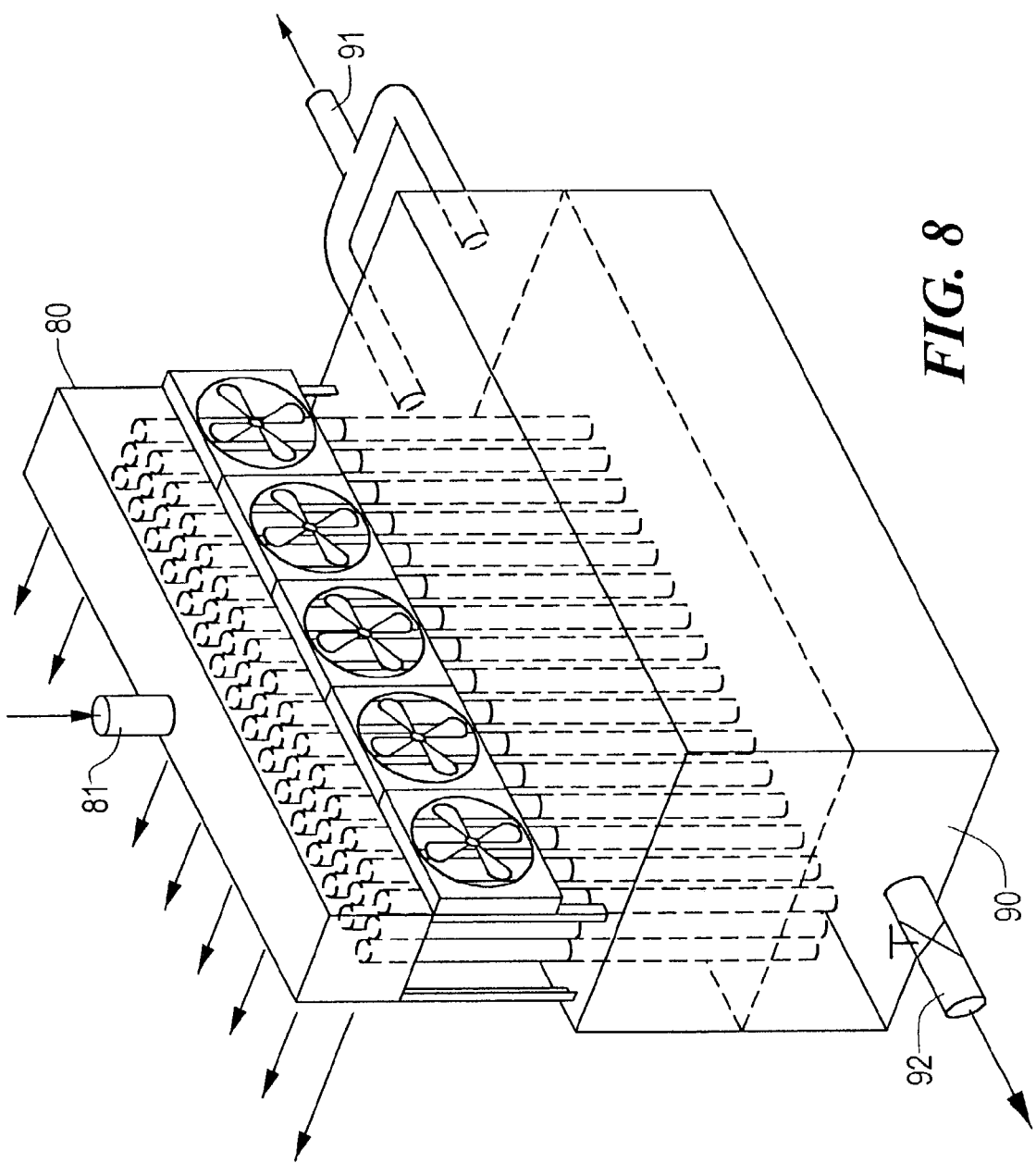
FIG. 8 is a schematic perspective view of the condenser of FIG. 1.

Condenser 80, shown in FIG. 8, condenses reactor gas given off in the reactor during the reaction phase. The condenser accepts gas from reactor gas outlet 25 via gas inlet 81, and delivers hydrocarbon condensate to collection tank 90. Collection tank 90 is coupled to supply fuel to excess air heater 60 via combustible gas outlet 91 and fuel supply line 61. The condenser includes a particulates trap (not shown) and a pressure region of about 1" water below atmospheric pressure. Liquids leave the condenser via liquids drain 92.

The Process

FIG. 1 shows the distillation unit in the reaction phase of a batch thermolytic distillation cycle. The previous batch cycle ends with the lid retracted, as illustrated in FIG. 3A, the char from the previous cycle having been discharged onto the conveyor system, as illustrated in FIG. 5.

A preferred process for batch thermolytic distillation of carbonaceous material, according to the present invention, proceeds as follows.

Loading a Charge of Wood

Referring to FIG. 3D, basket carrier 31 moves porous basket 30 from its tipped position (the upper position shown in FIG. 5) to its operational position inside reactor 20. To do this, basket carrier 31 rotates the basket about a pivot axis defined by pivot bar 32 so the basket moves along arc B—B of FIG. 5. Then, as shown in FIG. 4, a charge of wood 100 is pushed by bulldozer or other means into basket 30. With the charge of wood in the basket, lid carrier 41, shown in FIG. 3B, moves lid 40 from its retracted position shown in FIG. 3A to its "reactor closed" position on top of reactor 20, as shown in FIG. 1. To reach the "reactor closed" position, the lid is driven first horizontally to a position directly above the reactor, then down onto the reactor, as shown in FIG. 3A by arrows A—A, by bi-rotational drive motor 45 operating to turn screw 46 (shown in FIG. 3C). Then the lid is pulled down onto the reactor and closed tightly by force exerted by hydraulic cylinder actuators 48. These hydraulic cylinder actuators actively hold the lid down while the lid is in its "reactor closed" position. This ensures that the reactor is tightly sealed during all phases of operation while the reactor is closed.

Perforated screen 42 (FIG. 3A) extends downward from the lid and fits within the opening of the basket.

When the reactor is filled with molten tin, screen 42 extends below the surface of the tin so that all of the charge is enveloped by tin. Otherwise, because the charge will tend to float, portions of the charge would be above the surface, and partially uncovered. Note also, in FIG. 3A, perimeter walls 43. These walls allow pivot bar 32 to be mounted high enough with respect to rim 29 of reactor 20 that tipping can occur. Rim 29 is beveled so that char tipped from the basket does not fall back into the reactor. Lid rim 44 is also beveled to properly mate with the reactor rim.

Tin Flow: Filling, Maintaining and Emptying the Reactor

Figure 6:
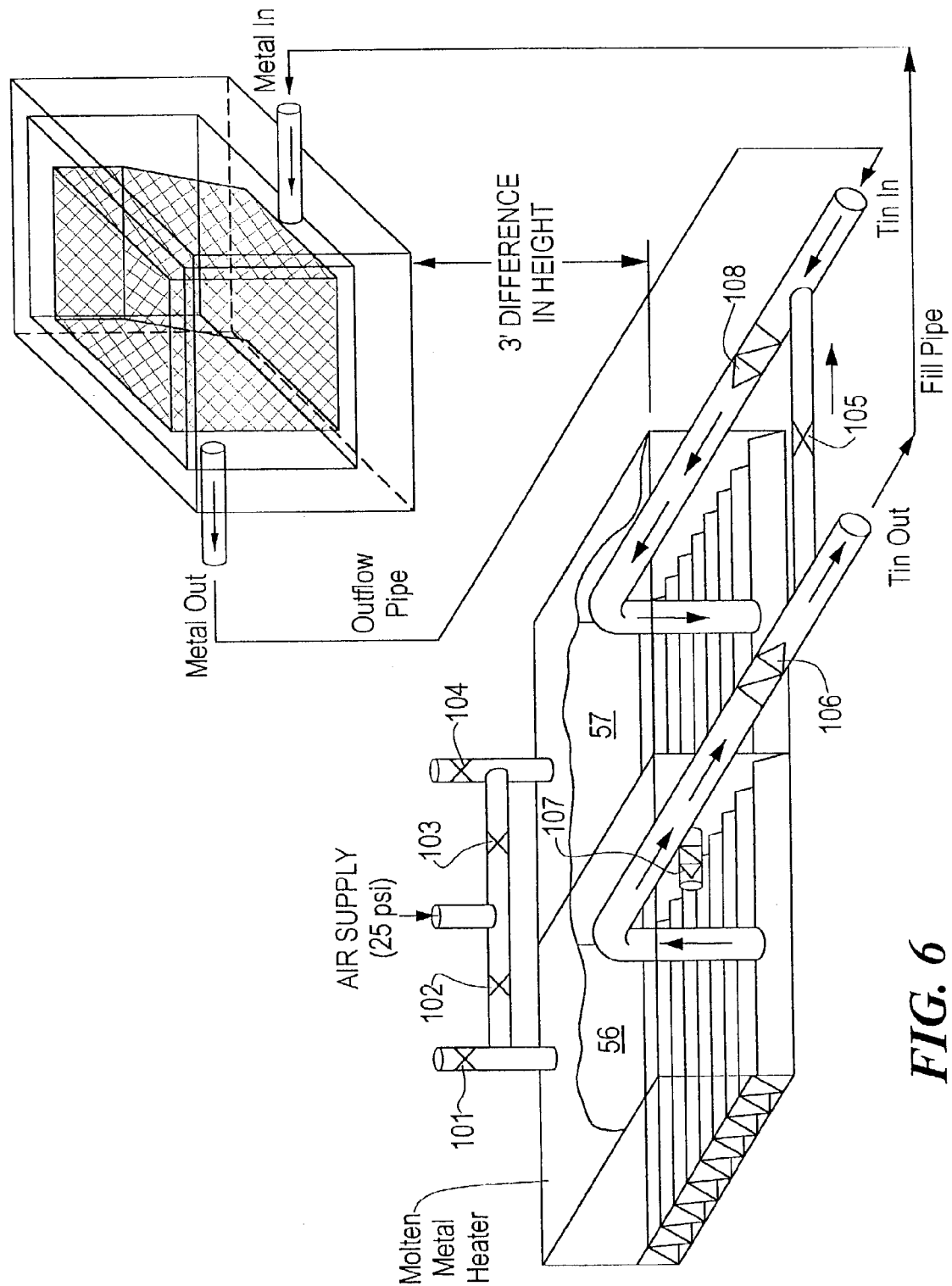
FIG. 6 is a schematic perspective view of a portion of the embodiment of FIG. 1, illustrating the flow of molten metal through the reservoir and through the reactor.

Reactor 20 is filled with molten tin from reservoir compartment 56 by application of air pressure to the surface of the tin within reservoir compartment 57. Molten tin returns from the reactor to the reservoir either by gravity or by application of steam pressure to the surface of the tin within the reactor. In the preferred embodiment, the reactor fills in approximately 60 seconds. The process of filling, maintaining and draining the reactor is illustrated in FIGS. 1 and 6. Referring to FIG. 6, the initial settings and sequencing of the tin flow valves is as listed in Table 1 below.

Gas Flow

Heating the charge in the reactor produces gas and char. Referring once more to FIG. 1, the char remains within the basket while the gas exits the reactor via gas outlet slot 24, and is conveyed to condenser 80 via reactor gas outlet 25 and reactor gas inlet 81.

A. Valve Position (Valves 101–105 shown in FIG. 6):
101: Closed, 102: Open, 103: Closed, 104: Open, 105: Closed.

With valves set as above, liquid tin is pressurized from air injected into first compartment 56, through valve 102. Liquid tin flows past check valve 106 and into the reactor. Tin fills up the reactor and overflows through pipes into second compartment 57, past check valve 108. Compartment 57 is vented through valve 104. Check valve 107 stops tin flow into compartment 57 while under pressure.

B. Valve Position:
101: Open. 102: Closed. 103: Open. 104: Closed. 105: Closed.

When compartment 56 is at a predetermined low level, valves 101–105 are set as above and liquid tin is pressurized in compartment 57. Check valve 108 holds. Check valve 106 holds. Check valve 107 allows flow from compartment 57 to compartment 56. When compartment 56 is at a predetermined high level, valves change and flows are as described in A.

A & B repeat until charge in reactor has been immersed in high temperature for 15 minutes.

C. Valve Position:
101: Open. 102: Closed. 103: Closed. 104: Open. 105: Open.

At the end of the time cycle, valves 101–105 are set as above and tin flows from the full reactor back through fill pipe by gravity, through valve 105, through check valve 108, into compartment 57, and through check valve 107 into compartment 56.

With a new load of wood, sequence restarts at A.

Using Steam to Displace Tin and Quench the Char

After the end of a predefined period of time, referring again to FIG. 1, steam generator 70 forces superheated steam at 228° F. and 20 psi into the reactor via steam conduit 71. This forces the molten tin out of the reactor and maintains an oxygen free environment within the reactor. After the reactor has been drained of molten tin, steam generator 70 forces steam into the reactor via conduit 71, thereby quenching the char and cooling the char and the reactor to 228° F.

Retracting the Lid

When reactor temperature and pressure are sufficiently low so it is safe to remove the lid, actuators 48 push the lid up, and motor 45 translates the lid horizontally (FIGS. 3A and 3C) until the lid is located under loading platform 110 (FIG. 3A), so retracting the lid clear of the loading path of FIG. 4 and the tipping path of FIG. 5.

The char in the basket is now cool enough to be tipped onto the belt conveyor system (FIG. 5).

Reactor Gas Processing

A portion of the gas leaving reactor 20, largely a mixture of water vapor and volatile hydrocarbons produced by thermolysis, is condensed in the condenser to produce fluids. The fluids are further separated into water, combustible gases, combustible liquids and tars.

Referring to FIG. 1, gas leaving reactor 20 exits downward via gas outlet slots 24, and wall conduits 23 between the double walls of the reactor. The gas then passes through reactor gas outlet 25 and is received by condenser 80 at reactor gas inlet 81. The gas is condensed in condenser 80 as distillate (wood-petrol) and other condensable products. Thus combustible and non-combustible gases, and water are liberated from the charge and recovered. Wood-petrol collects in tank 90. Wood petrol from tank 90 is separated into a light fraction, a heavy fraction, and non-condensed combustible gas in a distillation column (not shown) within the condenser. Some or all of the combustible gas is burned in excess air heater 60 to maintain the proper temperature of molten tin in reservoir 50.

Minimizing Reactor Heat Loss

Wall conduits 23 in the end walls of reactor 20 are shown in FIG. 1. Wall conduits 23 in side walls 28 of reactor 20 are shown in FIG. 3D. These conduits provide a passage for vapor produced by thermolysis. The double-wall structure of the reactor bath significantly reduces heat loss from the molten tin.

Heating the Reservoir

Reservoir 50 includes corrugated bottom 59, shown in FIG. 7B, which serves as part of heat exchanger 53, shown in FIG. 1. The corrugated bottom significantly increases heat exchange surface area and facilitates heat transfer between the hot gases from excess air heater 60, shown in FIG. 7A, and the molten tin in the reservoir. The corrugated bottom also provides the strength needed to support the enormous weight of a bath of molten tin.

Referring now to FIGS. 7A and 7B, excess air heater 60 includes air blower 62, duct 67, fuel supply line 61, and perforated pipe 65, the perforated pipe having a plurality of nozzles 66. Arrows in FIGS. 7A and 7B show "excess air" flowing over the nozzles (which in use will be emitting flame), and heated air flowing into heat exchanger 53. On startup, excess air heater 60 may be fueled by auxiliary fuel via auxiliary fuel supply line 64 shown in FIG. 1.

EXAMPLE 1

Distillation of Wood

Molten tin is used at a temperature of approximately 851° F. (455° C.). When the reactor is filled with molten tin, the depth of the tin in the reactor is 30 inches. The basket is 60 inches long, 36 inches deep and 60 inches wide, i.e. 62.5 cubic feet per basket. Wood having a maximum cross section of one inch is loaded into the basket. Wood is immersed for a predetermined immersion time of 10 minutes. This is sufficient to fully cook wood having a smallest cross section no greater than one inch.

Assuming the 62.5 cubic feet basket is loaded with wood having a density of 15 lb/cubic ft., at a fill density of 54%, there are 506 lb of wood in the basket. Assuming a 12 minute cycle time to provide a 10 minute immersion time, then 506 lb of wood is treated every 12 minutes. Thus, a single distillation unit has a capacity to treat approximately 2,500 lb per hour i.e. 60,000 lb per 24-hour day, or approximately 30 tons per 24-hour day. For a higher throughput rate, multiple distillation units may be used, mounted side by side as shown in FIG. 2.

EXAMPLE 2

Distillation of Shredded Rubber Tires

In the second preferred embodiment the invention provides a process for converting pieces of shredded rubber tires to hydrocarbons and char by immersion in molten tin. Pieces of shredded rubber tires are converted at substantially the same temperature, approximately 851° F. (455° C.), at which lump wood is converted.

In the second preferred embodiment the reactor is filled with molten tin to a depth of 30 inches. The basket is 60 inches long, 36 inches deep and 60 inches wide, i.e. 62.5 cubic feet per basket. Pieces of shredded rubber tires, having a length of 2–3 inches, a cross section of one half inch, and a density of 55 lb/cubic ft are loaded into the basket. The pieces are immersed for a predetermined immersion time of 12 minutes. This is sufficient to fully cook pieces having a cross section of one half inch.

Assuming the 62.5 cubic feet basket is loaded at a fill density of 45% there are 1546 lb of shredded tire pieces in a basket. Assuming a 15 minute cycle time to provide a 12 minute immersion time, then 1546 lb of shredded tire pieces are treated every 15 minutes. Thus, a single distillation unit has a capacity to treat 6187 lb per hour i.e. 148500 per 24 hour day, or approximately 74 tons per 24 hour day. For higher throughput rates, multiple distillation units may be used, mounted side by side as shown in FIG. 2.

Experimental Results

Experimental results, from experiments on thermolysis of wood conducted on a laboratory apparatus, are listed in Tables 1–5 below. These results are from tests conducted on various dates during the period November, 1997 through January, 1998.

TABLE 1

ANALYSIS OF DISTILLATE (Nov. 7, 1997)

| | |
|---|---|
| Calorific value | 20,000 BTU/kg |
| Engler # | 2–3 |
| Flash Point | 62° F. |
| Sulfur | absent |
| Chlorine | traces |
| Residue of distillation | 0.7% w |
| Lead | absent |

TABLE 2A

ANALYSIS OF TAR (Nov. 7, 1997)

| | |
|---|---|
| Calorific value | 28,000 BTU/kg |
| Engler # | 30 |

TABLE 2A-continued

ANALYSIS OF TAR (Nov. 7, 1997)

| | |
|---|---|
| Flash Point | 124 F. |
| Sulfur | absent |
| Chlorine | traces |
| Residue of distillation | 4% w |
| Lead | absent |

Tar for analysis was collected from a vapor exit pipe above the baskets. The material is a bituminous oil consisting of a mixture of heavy hydrocarbons.

TABLE 2B

ANALYSIS OF TAR (Nov. 14, 1997)

| | Weight % |
|---|---|
| Carbon | 51.2% |
| Hydrogen | 6.51% |
| Nitrogen | 0.16% |
| Oxygen | 38.6% |
| Sulfur | 0.03% |
| Proximate Analysis | |
| Ash | 3.47% |
| Volatile Matter | 77.9% |
| Fixed Carbon | 18.6% |
| Heating Value in BTU/lb | 9090 BTU/lb |

TABLE 3

ANALYSIS OF COMBUSTIBLE GAS (Dec. 11, 1997)

| Components | Volume % | Weight % |
|---|---|---|
| Hydrogen | 3.77 | 0.22 |
| aOxygen | 1.47 | 1.34 |
| Nitrogen | 5.82 | 4.65 |
| Carbon Monoxide | 33.69 | 26.93 |
| Methane | 5.14 | 2.35 |
| Carbon Dioxide | 46.15 | 57.96 |
| Hydrogen Sulfide | <0.01 | <0.01 |
| Ethane | 1.07 | 0.92 |
| Propane | 0.54 | 0.67 |
| Butanes | 0.79 | 1.31 |
| Pentanes | 0.97 | 1.99 |
| Hexanes | 0.35 | 0.87 |
| >Hexanes | 0.24 | 0.78 |
| TOTALS | 99.99 | 99.99 |

| Components | Mole % | Weight % |
|---|---|---|
| Carbon | 31.09 | 32.96 |
| Hydrogen | 22.37 | 1.99 |
| Oxygen | 42.69 | 60.28 |
| Nitrogen | 3.85 | 4.77 |
| Sulfur | <0.10 | <0.10 |
| Specific Gravity (Air = 1) | | 1.2099 |
| *Specific Volume, cu. Ft./lb. | | 10.83 |
| *Gross Heating Value, BTU/cu. Ft. | | 296.1 |
| **Gross Heating Value, BTU/cu. Ft. | | 302.2 |
| **Gross Heating Value, BTU/lb. | | 3272.6 |
| **Net Heating Value, BTU/cu. Ft. | | 284.5 |
| **Net Heating Value, BTU/lb. | | 3080.8 |
| *Net Heating Value, BTU/cu. Ft. | | 278.7 |
| Compressibility Factor "Z" (60° F., 14.696 psig) | | 0.9972 |

*Water Saturated at 0.25636 psig
**Dry Gas @ 60° F., 14.696 psig

TABLE 4

ANALYSIS OF DISTILLATE (Dec. 24, 1997)

|  | Heavy Fraction | Light Fraction |
|---|---|---|
| Calorific Value | 28,360 BTU/KG | 20,570 BTU/KG |
| Specific Gravity | 0.93 KG/liter | 0.84 KG/liter |
| Flash Point | 87° C. | 24° C. |
| Methanol | 13% W. | 26% W. |
| Ethanol | 2% W. | 3.5% W. |
| Viscosity ° E | 8 | 2 |
| Sulfur | Traces | Traces |
| Chlorine | Traces | Traces |
| Lead | Absent | Absent |
| Residue at 300° C. | 7% W. | 0.2% W. |
| Water in the Sample (The analysis was made after de-watering) | 8% | ~2% |

TABLE 5

YIELDS OF DISTILLATE & COMBUSTIBLE GAS (Jan. 11, 1998)

OPERATING CONDITIONS

| | | RESIDENCE | | ANALYSIS | | |
|---|---|---|---|---|---|---|
| MASS OF CHARGE | TEMP ° F. | TIME (MINUTES/ SECONDS) | COAL % WT | LIQUID HEAVY % WT | LIQUID LIGHT % WT | GAS % |
| 38.4 g | 750 | 8'20" | 23.7 | 11 | 39 | 26.3 |
| 41.0 g | 800 | 9'9" | 24.15 | 12.43 | 39.25 | 24.15 |
| 35.9 g | 850 | 7'30" | 27 (with lead) | 10 | 38.4 | 24.6 |

What is claimed is:

1. A distillation unit for batch thermolytic distillation of lump carbonaceous material, comprising:
a reactor bath adapted to hold a molten material selected from a group of molten materials consisting of molten metal and molten salt;
a retractable lid;
a porous basket pivotally mounted within the reactor bath between a pair of opposing reactor bath walls; and
means for tipping the basket from a first position inside the reactor bath in an upright orientation, to a second position partially inside and partially outside the reactor bath in a substantially inverted orientation.

2. A distillation unit according to claim 1, further comprising at least one hydraulic hold-down clamp, the clamp attached between the reactor bath and the lid.

3. A distillation unit according to claim 1, wherein the retractable lid includes a perimeter curtain wall having a beveled lower rim shaped to fit a facing beveled rim of the reactor bath.

4. A distillation unit according to claim 1, wherein the retractable lid includes a perforated screen.

5. A distillation unit according to claim 1, wherein the reactor further includes an inlet conduit for molten material, an outlet conduit for molten material, and a reactor gas outlet; and wherein the unit further comprises a reservoir for storing molten material, the reservoir having a supply conduit coupled to supply molten material to the reactor inlet conduit, and a return conduit coupled to accept molten material from the reactor outlet conduit.

6. A distillation unit according to claim 5, wherein the base of the reactor is higher than the top of the reservoir.

7. A distillation unit according to claim 6, wherein the base of the reactor is approximately three feet higher than the top of the reservoir.

8. A distillation unit according to claim 5, wherein the reservoir includes an excess-air heater.

9. A distillation unit according to claim 8, wherein the reservoir includes a corrugated heat exchanger.

10. A distillation unit according to claim 8, wherein the excess-air heater includes a fuel inlet coupled to an auxiliary fuel supply.

11. A distillation unit according to claim 5, wherein the reservoir includes two compartments with a check valve connecting them.

12. A distillation unit according to claim 11, wherein the reservoir includes a pressurized air inlet.

13. A distillation unit according to claim 11, wherein the reservoir includes a controllable vent.

14. A distillation unit according to claim 5, wherein the unit further comprises a steam generator with a steam generator flue;
wherein the reservoir includes an excess-air heater with an excess-air heater flue;
wherein the excess-air heater flue is coupled to deliver excess-air heater flue gas to the steam generator; and
wherein the excess-air heater flue is coupled to deliver excess-air heater flue gas to the steam generator flue via a bypass flue and a control valve.

15. A distillation unit according to claim 1, wherein the reactor bath includes a wall conduit.

16. A distillation unit according to claim 5, further comprising a condenser, coupled to the reactor gas outlet, and including a particulates trap having a pressure region below atmospheric pressure.

17. A distillation unit for batch thermolytic distillation of lump carbonaceous material, comprising:
a reactor including a reactor bath adapted to hold a molten material selected from a group of molten materials consisting of molten metal and molten salt, a retractable lid, and a porous basket pivotally mounted within the reactor bath; and
a reservoir for storing molten material, the reservoir having a supply conduit coupled to supply molten material to the reactor bath, a return conduit coupled to accept molten material from the reactor bath, and excess-air heater means for burning a mixture of reactor gas and excess air to heat molten material in the reservoir to a predetermined temperature.

18. A distillation unit according to claim 17, wherein the reservoir includes a corrugated heat exchanger.

19. A distillation unit according to claim 17, wherein the excess-air heater includes a fuel inlet coupled to an auxiliary fuel supply.

20. A distillation unit for batch thermolytic distillation of lump carbonaceous material, comprising:
a reactor including a reactor bath adapted to hold a molten material selected from a group of molten materials consisting of molten metal and molten salt, a retractable lid, and a porous basket pivotally mounted within the reactor bath, the reactor bath having an inlet conduit for molten material, an outlet conduit for molten material, and a reactor gas outlet; and
a reservoir for storing molten material, the reservoir having first and second compartments, a supply conduit coupled to supply molten material to the reactor inlet conduit from the first compartment, a return conduit coupled to accept molten material from the reactor outlet conduit to the second compartment, and means for permitting flow of molten material from second to first compartments and preventing flow of molten material from first to second compartments.

21. A distillation unit according to claim 20, wherein the means for permitting flow of molten material from second to first compartments and preventing flow of molten material from first to second compartments includes a check valve.

22. A distillation unit according to claim 20, wherein the reservoir includes a pressurized air inlet.

23. A distillation unit according to claim 20, wherein the reservoir includes a controllable vent.

24. A distillation unit for batch thermolytic distillation of lump carbonaceous material, comprising:
a reactor including a reactor bath adapted to hold a molten material selected from a group of molten materials consisting of molten metal and molten salt, a retractable lid, and a porous basket pivotally mounted within the reactor bath;
reservoir means for storing molten material received from the reactor bath;
excess-air heater means for heating molten material in the reservoir;
steam generator means for feeding steam into the reactor; and
conduit means for passing excess-air heater flue gas through the steam generator means to generate steam.

25. A distillation unit according to claim 24, wherein the steam generator means includes a steam generator flue, and the excess-air heater means includes an excess-air heater flue, the distillation unit further comprising;
conduit means for delivering excess-air heater flue gas to the steam generator; and
conduit means for delivering excess-air heater flue gas to the steam generator flue via a bypass flue and a control valve.

26. A distillation unit for batch thermolytic distillation of lump carbonaceous material, comprising:
a reactor including a reactor bath adapted to hold a molten material selected from a group of molten materials consisting of molten metal and molten salt, a retractable lid, and a porous basket pivotally mounted within the reactor bath, the reactor bath having a reactor gas outlet;
reservoir means for storing molten material received from the reactor bath; and
condenser means for condensing reactor gas and trapping particulates using a particulates trap having a pressure region below atmospheric pressure.

27. A distillation unit for batch thermolytic distillation of lump carbonaceous material, comprising:
a reactor including a reactor bath adapted to hold a molten material selected from a group of molten materials consisting of molten metal and molten salt, a retractable lid, and a porous basket pivotally mounted within the reactor bath; and
reservoir means for storing molten material received from the reactor bath;
wherein the reactor bath includes means for surrounding molten material in the reactor bath with a heat-retaining layer of reactor gas.

28. A distillation unit according to claim 27, wherein the means for surrounding molten material in the reactor bath includes a wall conduit.

29. A distillation system for batch thermolytic distillation of lump carbonaceous material, comprising:
a row of multiple distillation units mounted side-by-side, each unit including a reactor bath adapted to hold a molten material selected from a group of molten materials consisting of molten metal and molten salt, a retractable lid mounted above the reactor bath, and a porous basket pivotally mounted within the reactor bath for tipping motion about an axis aligned with the row;
loading means, on a first side of the row, for delivering lump carbonaceous material to each basket; and
conveyor means, on a second side of the row, for accepting processed carbonaceous material on tipping of a basket.

30. A process for batch thermolytic distillation of lump carbonaceous material, comprising:
a) placing a porous basket into a reactor bath;
b) putting a charge of lump carbonaceous material into the basket;
c) closing a retractable lid onto the reactor bath;
d) introducing molten material and steam into the reactor bath to produce gas and char by thermolytic conversion of the charge; and
e) emptying the basket by tipping the basket from a first position inside the reactor bath in an upright orientation, to a second position partially inside and partially outside the reactor bath in a substantially inverted orientation.

* * * * *